US005675785A

United States Patent [19]

Hall et al.

[11] Patent Number: 5,675,785
[45] Date of Patent: Oct. 7, 1997

[54] DATA WAREHOUSE WHICH IS ACCESSED BY A USER USING A SCHEMA OF VIRTUAL TABLES

[75] Inventors: Guy Travis Hall, Loomis; Mark Sturdevant, San Jose; Suzie Cho Yee, Cupertino; Yukon Fong, Union City; Neil Yoshida, Sunnyvale; Guy Randazzo, Rocklin; Mark Gratiot, Forest Hill; Marc Meyer, Granite Bay; Brian Fischer, Mokelumne Hill, all of Calif.

[73] Assignee: Hewlett-Packard Company, Palo Alto, Calif.

[21] Appl. No.: 317,437

[22] Filed: Oct. 4, 1994

[51] Int. Cl.$^6$ .................................................. G06F 17/30
[52] U.S. Cl. ........................ 395/613; 395/601; 395/602; 395/604; 395/611
[58] Field of Search .................................. 395/600, 148, 395/155–161, 159, 160, 601, 602, 604, 611, 613

[56] References Cited

U.S. PATENT DOCUMENTS

| 4,819,160 | 4/1989 | Tanka et al. | 395/600 |
|---|---|---|---|
| 5,276,870 | 1/1994 | Shan et al. | 395/600 |
| 5,418,950 | 5/1995 | Li et al. | 395/600 |
| 5,418,957 | 5/1995 | Narayan et al. | 395/700 |
| 5,428,776 | 6/1995 | Rothfield | 395/600 |
| 5,448,726 | 9/1995 | Crimsie et al. | 395/600 |
| 5,448,727 | 9/1995 | Annevelinbk | 395/600 |
| 5,504,885 | 4/1996 | Alashqur | 395/600 |
| 5,519,859 | 5/1996 | Grace | 395/600 |
| 5,550,971 | 8/1996 | Brunner et al. | 395/161 |

OTHER PUBLICATIONS

"Client/Server accounting: accounting system based on client/server architectures increase productivity" by Stewark McKie, DBMS, V6, n2, p. 62(5); Feb., 1993.

"Using SQL:" by Que Corporation, 1993.

*Primary Examiner*—Paul V. Kulik
*Assistant Examiner*—Hosain T. Alam

[57] ABSTRACT

A database warehouse includes a database having data arranged in data tables, e.g., fact tables and reference tables. A warehouse database hub interface is connected to the database. The warehouse database hub interface presents to a user a schema of the data in the database warehouse. The schema consists of virtual tables. Arrangement of the data in the virtual tables is different than arrangement of data in the fact tables and the reference tables. A user generates queries based on the schema provided by the warehouse database hub interface. In response to a such a query for particular information stored in the database warehouse, the warehouse database hub interface modifies the query to take into account pre-computed values and the arrangement of the data within the database warehouse. Then the warehouse database hub interface queries the database warehouse using the modified query to obtain the particular information from the database warehouse. Finally, the warehouse database hub interface forwards the particular information obtained from the database warehouse to the user.

26 Claims, 5 Drawing Sheets

CITY — 15

| CODE | CITY | RGN |
|---|---|---|
| BTN | BOSTON | 100 |
| DVR | DENVER | 200 |
| TPA | TAMPA | 100 |
| CHG | CHICAGO | 200 |

REGION — 16

| MANAGER | NAME | RGN |
|---|---|---|
| SURVIANT | EASTERN | 100 |
| GRATIOT | CENTRAL | 200 |

DETAIL FACT TABLE — 11

| PN | CODE | WEEK | DSCT | SALE |
|---|---|---|---|---|
| LJ3 | BTN | 9203 | 1901 | 34006 |
| LJ4 | DVR | 9249 | 1025 | 14204 |
| LJ3P | TPA | 9216 | 953 | 11208 |
| IJ500 | DVR | 9250 | 372 | 7897 |
| LJ4 | BTN | 9207 | 1003 | 14003 |

SUMMARY FACT TABLE — 12

| PL | CODE | WEEK | DSCT | SALE |
|---|---|---|---|---|
| LJ | BTN | 9203 | 13009 | 145907 |
| LJ | DVR | 9249 | 14204 | 85454 |
| PC | TPA | 9216 | 21206 | 507154 |
| IJ | DVR | 9250 | 17894 | 377634 |
| PT | BTN | 9207 | 14004 | 100788 |

PRODUCT NUMBER — 13

| PN | PL | PRODUCT | WT. |
|---|---|---|---|
| LJ3 | LJ | LASERJET III | 22 |
| LJ4 | LJ | LASERJET 4 | 20 |
| IJ500 | IJ | DESKJET 500 | 12 |
| IJ550 | IJ | INKJET 550 | 13 |

PRODUCT LINE — 14

| PL | PRODUCT NAME |
|---|---|
| LJ | LASERJETS |
| PC | PERSONAL COMPUTER |
| IJ | DESKJET |
| PT | PALMTOP |

FIGURE 2

DATA WAREHOUSE WHICH IS ACCESSED BY A USER USING A SCHEMA OF VIRTUAL TABLES

BACKGROUND

The present invention concerns intelligent access of data in a data warehouse.

A data warehouse is a storage facility which stores large amounts of data. Typically, a data warehouse is built from two types of tables: fact tables and reference tables. A fact table consists of the basic components of a transaction (unit of record) which is kept in the data warehouse. The fact table contains the basic information in the data warehouse. Reference tables describe attributes of entries in the fact table such as time, product, market, or organization. Each reference table may include many additional pieces of information that relate to an attribute of the fact table. Fact table entries are typically linked to reference tables through one or more keyed columns containing a code (e.g., product number, customer id, or sales rep code).

All information from a data warehouse may generally be derived from the reference tables and the fact table. However, for most data warehouses, their size tends to create performance problems when performing the various summarizations requested by an end user. For example, thousands of rows might need to be summarized within millions of records (or millions of rows within tens of millions of records) in the data warehouse. A common solution to this problem is to provide pre-summarized fact tables in addition to the base fact table.

Some fact tables differ from the base fact table by summarizing numeric values by grouping one of the attributes into a higher level, such as summarizing sales by month instead of day. Others provide higher summarizations by eliminating one of the attributes, such as city code or product number.

Since summary tables typically consume 50% to 90% of the data warehouse disk space and are a major factor in data warehouse performance, they deserve significant attention. The degree to which summary tables closely match actual user requests makes the difference between a data warehouse that performs well and one that does not. This may be one of the most significant contributors to data warehouse success.

Creation of summarized fact tables meets several needs. For example, it meets the need for higher performance on many queries because tables are pre-summarized. Summarized fact tables may be structured closer to end user needs. More users and requests may be handled since less on the fly summarization is required. This assumes users select the tables that are optimal for the query.

There are, however, several problems that arise from the creation of summarized fact tables. For example, as the number of summary tables increases this adds complexity to the access of the tables. Thus as the number of summary tables increases a user must be more sophisticated in order to know which summary tables to access. Thus, the number of summaries that may be provided becomes limited because the complexity increases beyond end user capabilities. The tradeoff becomes data warehouse performance versus the number of users in the organization that are able to use it effectively (i.e., higher performance vs. increased complexity).

Also, in many cases, it is likely that more than one summary fact table can provide the information needed by an end user. Selecting the right table is important because it substantially affects performance. Query performance is jeopardized when a user selects a table that provides the needed information, but is far less summarized than another that can provide the information in a small fraction of the time and at a lower system cost. In fact, experience suggests that users will pick the table with the greatest number of interesting columns and use it to build the query even though it likely is the least summarized.

Additionally, selecting the right table is also important because it affects the complexity of the query. The difficulty of forming a query increases if the user picks a fact table that is a less summarized table and requires the user to formulate the "group bys" and aggregates. A "group by" clause combines records with identical values in the specified field list into a single record. A summary record is created for each group of combined records. For each included Structured Query Language (SQL) aggregate, such as "SUM" or "COUNT", a summary value is used in the summary record. SQL aggregate functions provide various statistics, such as "SUM" average ("AVE"), minimum ("MIN"), maximum ("MAX"), etc., on sets of values. They are available when summarizing records with the "Group By" clause.

As users iterate and incrementally modify their query when exploring, they may be required to continually change which summary table is used, or alternatively always use a low level detailed fact table that results in very poor performance and high system cost.

Administrators are restricted from optimizing the physical layout of the data warehouse since the physical layout is also known and used by end users. This situation creates an inherent conflict between a stable data warehouse layout that minimizes disruption for end users and a system that may be performance tuned by the administrator. Users are left with a data warehouse that either periodically changes its definition or one that performs poorly.

An additional issue is that there are far more levels of summaries possible in a data warehouse than is practical to create. It is not practical to store all possible combinations of summary information, due both to storage constraints and computation time. One quickly ends up with the number of possible summary fact tables being beyond the practical capabilities of the data warehouse. Furthermore some of these tables will not be used very often.

Another problem with summarized tables is the time and resources required to update them as new data flows into the warehouse. Often during the update process, the warehouse cannot be available to end users. As the number of summaries increase, so does the warehouse down time to the point that availability is severely limited. In one case, updates would start Saturday and would sometimes not complete until Wednesday.

Challenges for the data warehouse administrator include determining which summaries will be used frequently initially, and then re-evaluating over time as query requirements change.

End users are faced with the challenge of locating the table which contains the information required or knowing how to derive the information if the desired table does not exist.

Beyond the problems of navigating a large number of tables, data warehouses are still a challenge for end users. For example, users must still formulate joins between the fact and reference tables. Incorrect formation of joins by end users is very common and often yields incorrect results without the user's awareness.

Also, given the large amounts of data in a data warehouse, summarization is much more common than requesting specific records. How to summarize properly is probably the second most difficult concept in decision support situations. Incorrect summarizations can be frequent and often yield incorrect results.

While possible, requiring a user to employ these database techniques to use the data warehouse effectively places on them a very significant burden. This essentially eliminates data warehouses from the reach of many end users. Only specialists or analysts who frequently work with the data can afford to invest the time necessary to learn and maintain knowledge of how to use the data warehouse.

In some cases it may be optimal to de-normalize some summaries by including descriptive information with the summary table. In these cases, end users will find descriptive columns in more than one place which adds to the confusion.

Additionally, data warehouses push the limits of systems and databases due to their sheer size. They present performance problems for access and management problems for loading and backup.

Also, changing business needs require changing the data warehouse. However for situations when this resource is widely used, these changes result in incorrect query results and user dissatisfaction with the data warehouse. Overall, even with the best attempts at communication, end user perception of the data warehouse will degrade to that of it being unstable and unreliable.

Further, the definition and contents of the data warehouse often change. For example, new information is desired to be tracked which was not available before. A purchasing data warehouse may wish to track amount of purchases from minority businesses, or an order history data warehouse may now need to track order fulfillment times. Both examples result in new columns being required to track the new information. Null values or some default is used for history when the data was not being tracked. If users are not aware of each of these changes, and when data is or is not available, the results from queries will be incorrect.

Another example of a changing warehouse is one where the scope of the data warehouse may be expanded. For example, it may become desirable to include contractors in a personnel data warehouse. Internal company orders might be included in the some order history data warehouse that previously only included external paying customers. If users are not aware of each of these changes, and when data is or is not available, the results from queries will be incorrect.

SUMMARY OF THE INVENTION

In accordance with the preferred embodiment of the present invention, an intelligent database warehouse is presented. The database warehouse includes a database having data arranged in data tables, for example, in fact tables and reference tables.

A warehouse database hub interface is connected to the database. The warehouse database hub interface presents to a user a logical schema of the data in the database warehouse. The schema consists of virtual tables. Arrangement of the data in the virtual tables is different than arrangement of data in the fact tables and the reference tables.

In general, a virtual schema is made up of virtual columns within virtual tables. In the present invention, virtual tables meet the requirements of a model for SQL and provide column grouping to simplify user location of virtual columns. Grouping is definable by the administrator and is not constrained to the physical implementation of the decision support database.

A user generates queries based on the schema provided by the warehouse database hub interface. In response to a such a query for particular information stored in the database warehouse, the warehouse database hub interface modifies the query to take into account pre-computed values and the current arrangement of the data within the database warehouse. Then the warehouse database hub interface queries the database warehouse using the modified query to obtain the particular information from the database warehouse. Finally, the warehouse database hub interface forwards the particular information obtained from the database warehouse to the user.

In the preferred embodiment, the query may be modified in a number of ways. For example, the warehouse database hub interface modifies the query by converting query columns to aggregates. Also, the warehouse database hub interface adds defaults to the query based on summary level of the query. At higher summary levels information is aggregated into fewer records. Lower summary levels contain records which are more detailed. For example, at a high summary level, sales by products by quarters may be stored, at a middle summary level, sales by products by month may be stored, and at a low summary level, sales by products by days may be stored.

The warehouse database hub interface modifies the query by adding limitations to the query for security purposes. Such limitations are based, for example on user and group identifications. The warehouse database hub interface modifies the query by converting the query to search for a level of data which exists in a fact table within the database warehouse. The warehouse database hub interface modifies the query by locating appropriate sources for the query, and generating a new query to each appropriate source located.

Also in the preferred embodiment, when the warehouse database hub interface queries the database warehouse to obtain the particular information, the warehouse database hub interface creates a result table and inserts database information into the result table as the database information is received from the database warehouse. The warehouse database hub interface changes summary level of the database information in the result table to generate the particular information. Further, the database hub may add descriptive information as part of the particular information.

The present invention provides for a separation between the physical layout of database warehouse and the virtual tables and columns presented to end users. The present invention allows for simpler query formation through the use of automatic joins and summarization. High performance may be obtained because the database hub interface has responsibility to select optimal summary fact tables and to track fact table partitioning and partition duplication. The query process is simplified because the physical structure and complexity in the warehouse are hid from the user. The warehouse schema is virtualized to provide one which is matched to the business use, automatically performing joins and summarizations. Query tools become simpler to use and applications simpler to develop. The result is a data warehouse which has high performance, is tunable yet provides a stable external interface.

BRIEF DESCRIPTION OF THE DRAWINGS

FIG. 2 shows tables of data within a database within the intelligent data warehouse shown in FIG. 1 in accordance with the preferred embodiment of the present invention.

DESCRIPTION OF THE PREFERRED EMBODIMENT

Figure 1:
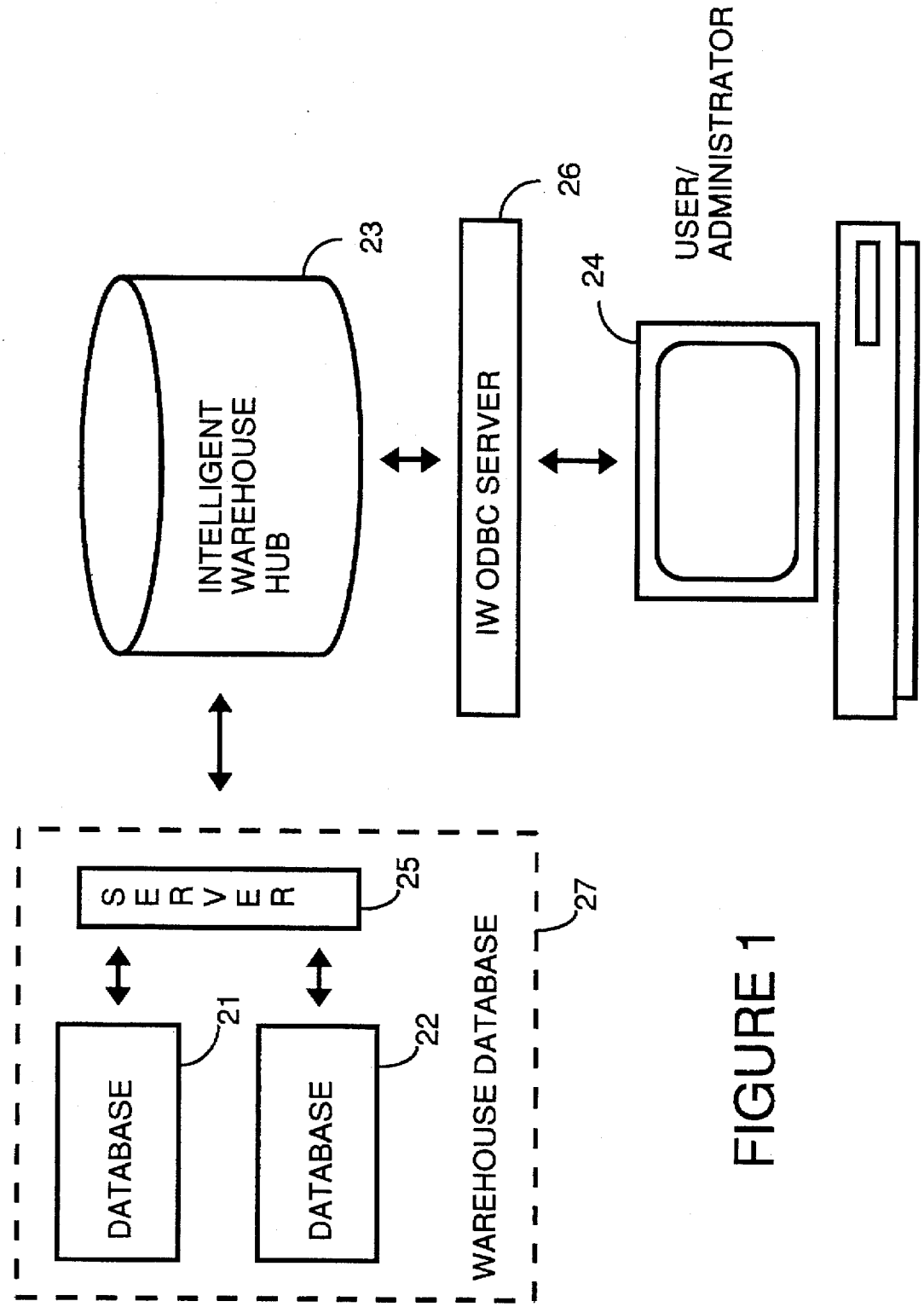
FIG. 1 shows a simplified block diagram of the elements of an intelligent data warehouse in accordance with the preferred embodiment of the present invention.

FIG. 1 shows the basic entities within an intelligent warehouse. A warehouse database 27 includes, for example, a database server 25, a distributed database portion 21 and a distributed database portion 22. For example, in the preferred embodiment database 27 may be implemented on an HP-UX system, available from Hewlett-Packard Company having a business address of 3000 Hanover Street, Palo Alto, Calif., 94304. For example, database 27 could be implemented using a data base management system (DBMS) product available from Ingres Corporation having a business address of 1080 Marin Village Parkway, Alameda, Calif. 94501, a DBMS product available from Oracle Corporation having a business address of 500 Oracle Parkway, Redwood Shores, Calif. 94065, Alternately, database 27 could be implemented using a DBMS product available from Informix Software, Inc., having a business address of 4100 Bohannon Drive, Menlo Park, Calif. 94025. Database 27 could be implemented using a DBMS product available from Sybase, Inc., having a business address of 6475 Christie Avenue, Emeryville, Calif. 94608. Database 27 could be implemented using a DBMS product available from Red Brick Systems, having a business address of 485 Alberto Way, Los Gatos, Calif. 95032. Database 27 could be implemented using HP Allbase/SQL, available from Hewlett-Packard Company.

Access to warehouse database 27 is achieved through an intelligent warehouse hub 23. A user utilizes a data access tool set 24 running on a personal computer to forward queries to intelligent warehouse hub 23.

In the preferred embodiment, intelligent warehouse tool set 24 may be implemented with any toolset that supports Microsoft's Open Data Base Connectivity (ODBC). For example, Clear Access Corporation having a business address of 200 West Lowe, Fairfield, Iowa 52556, provides such a toolset. Alternately, HP Information Access, available from Hewlett Packard Company, may be used. MS Access, MS Excel or MS Query, available from Microsoft Corporation having a business address of One Microsoft Way, Redmond, Wash. 98052, may be used. 4GLs may be used, or 3GLs such as Visual BASIC, C, Small Talk and Pascal may be used. Also, Executive Information Systems (EIS) may be used.

PC based intelligent warehouse (IW) ODBC driver within IW tool set 24 communicates with an intelligent warehouse ODBC server 26, for example, over standard Windows networking, for example, WINSOCK or WSOCKETS, available from Microsoft Corporation and other companies. Alternately, other non-ODBC products may be used.

FIG. 2 shows simplified sample data within warehouse database 27. A detail fact table 11 contains the basic information of warehouse database 27. A reference table 13 describes attributes based on the product number. A reference table 14 describes attributes based on the product line. A reference table 15 describes attributes based on the city code. A reference table 16 describes attributes based on the region. A summary fact table 12 differs from detail fact table 12 by summarizing the data in detail fact table 11 by product line instead of product number.

Intelligent warehouse hub 23 accepts incoming queries and issues the database operations to the underlying DBMS to satisfy optimally the end user request.

Intelligent warehouse hub 23 has the following responsibilities with respect to the execution of incoming queries. Intelligent warehouse hub 23 provides a schema which abstracts the definition of the physical data warehouse into one which is independent of which summaries are populated. Intelligent warehouse hub 23 determines which summary tables may be used to satisfy the needs of the incoming query. Intelligent warehouse hub 23 adapts the query to use the best summary available at the current time. Intelligent warehouse hub 23 adds "joins" to reference tables, "Group By" and "Sum" components to the query as necessary. For a discussion of SQL, see for example, C. J. Date, *An Introduction to Database System*, Addison-Wesley Publishing Company, Menlo Park, Calif., 1982.

Intelligent warehouse hub 23 accomplishes the above responsibilities with the use of virtual tables. Virtual tables are groupings of virtual columns which intelligent warehouse hub 23 hub 23 makes available to a user.

Formation of virtual tables within intelligent warehouse hub 23 is done by an administrator of the intelligent data warehouse. The administrator identifies to intelligent warehouse hub 23 the data summaries and reference tables which actually exist in warehouse database 27. Data columns in these tables, which the administrator wishes to make available to end users, are also identified to intelligent warehouse hub 23. Intelligent warehouse hub 23 groups data columns into virtual tables.

The grouping of data columns by virtual tables serves two purposes. First, the columns are grouped in such a way that they may be easily found by end users. Second, the table and column structure are maintained in a form expected by ODBC client tools 24.

The administrator may assign a new external name and provide a comment for each data column. The administrator also supplies a name and comment for each virtual table. When the end user query tools request schema information from intelligent warehouse hub 23, it is these virtual tables and columns which are provided. The physical columns in warehouse database 27 are hidden from the user.

Data columns which exist in more than one fact table in warehouse database 27 are combined within intelligent warehouse hub 23 into a single column for the external interface. For example, the column "Sale" may be summarized in several different fact tables in warehouse databases 27, it is present only once in the virtual tables. It will be the responsibility of intelligent warehouse hub 23 to determine which physical table and column should be used when a Structured Query Language (SQL) query is processed for the end user.

Figure 3:
FIG. 3 shows virtual tables within an intelligent warehouse hub within the intelligent data warehouse shown in FIG. 1 in accordance with the preferred embodiment of the present invention.

For example, FIG. 3 shows a virtual table 31, a virtual table 32, a virtual table 33 and a virtual table 34. PC based intelligent warehouse tool 24 builds SQL statements based on this schema. Joins and summary aggregations (SUM()) are automatically performed by intelligent warehouse hub 23 hub 23 and therefore need not be specified within the PC based intelligent warehouse tool 24. Intelligent warehouse hub 23 converts the query to utilize the most appropriate fact and reference tables and issues the modified query to database server 25.

Hierarchies establish a parent—child relationship between reference tables. Example parent—child relationships are as set out in Table 1 below:

TABLE 1

| Parent | Child |
| --- | --- |
| Product Line | Product Number |
| Product Group | Product Line |
| County | City |
| State | County |
| Group | Division |
| Sector | Group |
| Year | Quarter |
| Quarter | Month |
| Month | Week |

In most cases, adding hierarchical information to most existing reference tables simply requires adding a parent column. More references tables are required to create other additional levels. For example, creating a product line—product number relationship requires a reference table to be added to warehouse database 27. Such a reference table is represented by Table 2 below:

TABLE 2

| PL | PRODUCTLINE |
| --- | --- |
| LJ | Laserjets |
| IJ | Inkjet Printers |
| PC | Personal Computers |
| DSK | Disk Drives |

Figure 4:
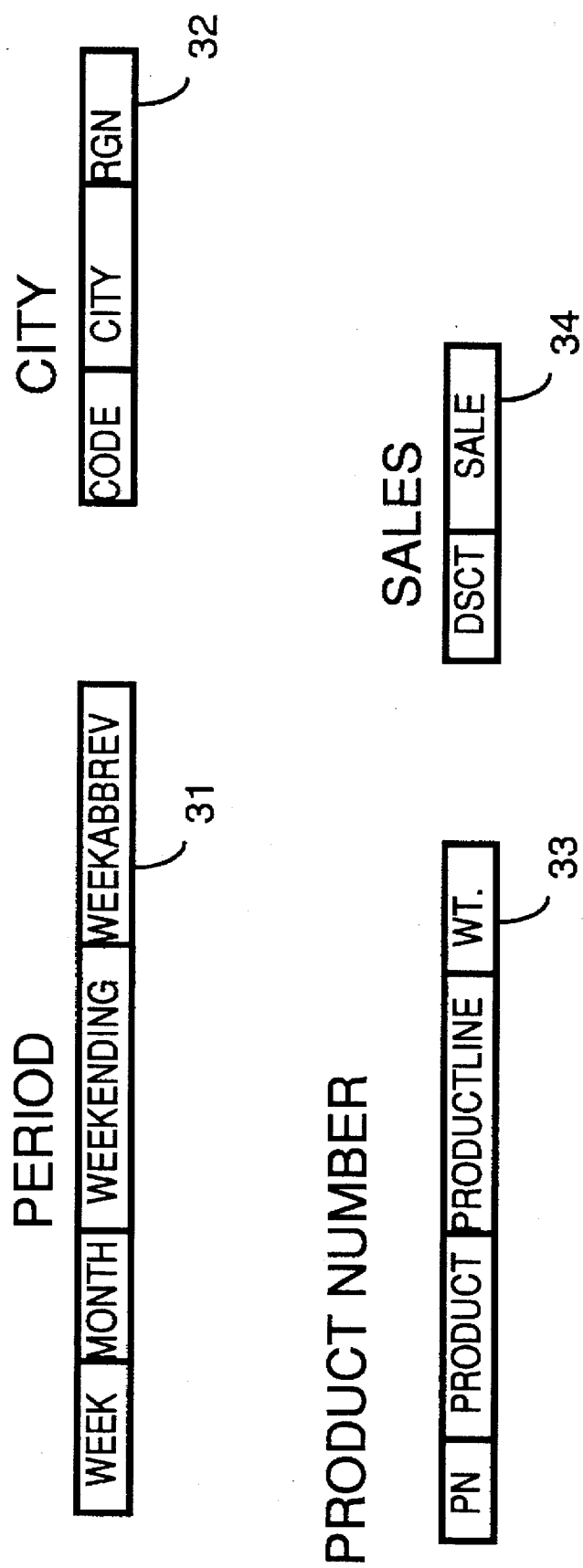
FIG. 4 shows modification to virtual tables shown in FIG. 3 in accordance with the preferred embodiment of the present invention.

In order to make the product line information available to a user of intelligent warehouse hub 23, intelligent warehouse hub 23 administrator adds a single column, "ProductLine", to virtual table 33. The result shown in FIG. 4.

Intelligent warehouse hub 23 converts incoming queries which use "ProductLine" to utilize the product number field, "PN", used in a fact table within warehouse database 27. This process is called rolling down the query. Once the data has been returned from the fact table in warehouse database 27, intelligent warehouse hub 23 joins the data in with the Product Number—Product Line reference table to be summarized at the level requested by the end user. This step is referred to as rolling up the data.

If product lines are grouped by Organizations, another column can be added to Table 2 to obtain Table 3 below:

TABLE 3

| PL | PRODUCTLINE | ORG. |
| --- | --- | --- |
| LJ | Laserjets | LJD |
| IJ | Inkjet Printers | DKD |
| PC | Personal Computers | HWD |
| DSK | Disk Drives | HWD |

Figure 5:
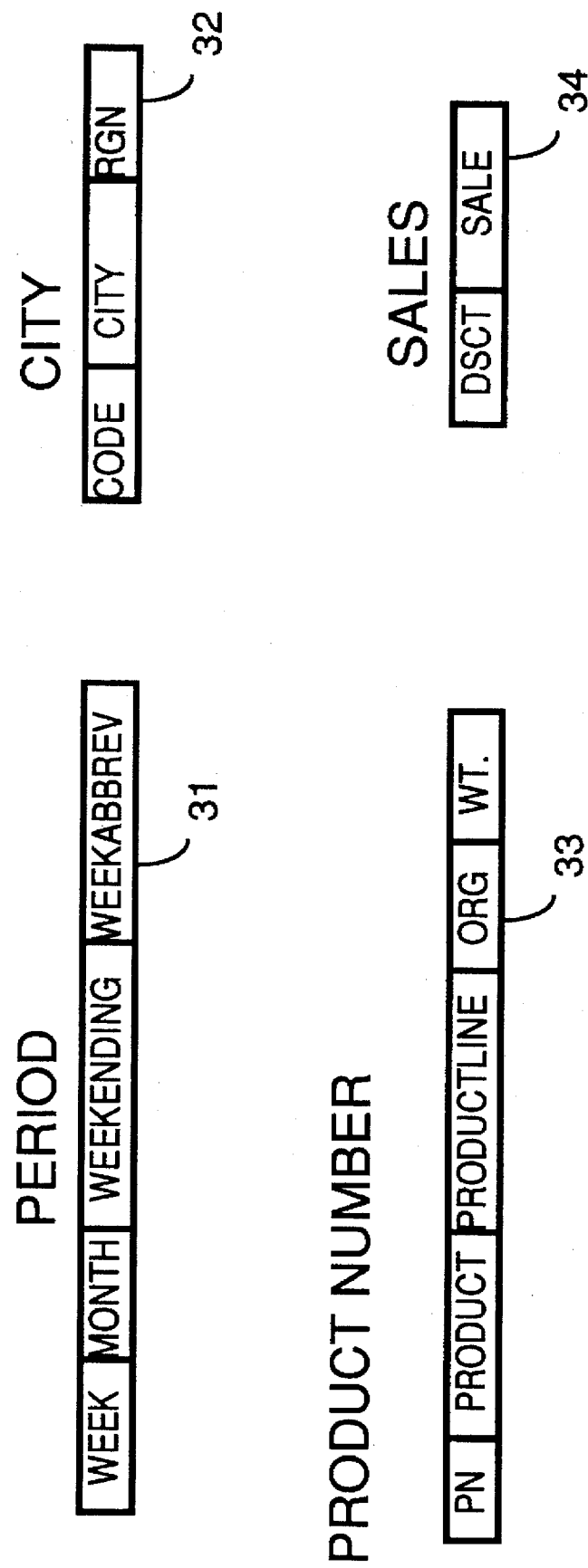
FIG. 5 shows modification to virtual tables shown in FIG. 4 in accordance with the preferred embodiment of the present invention.

Adding Organization to virtual table 33 would cause the schema to look like to the end user as set out in FIG. 5. If a more descriptive organizational name is desired, another reference table would be created:

The warehouse may have several summary levels. Some summaries are normalized and require the use of reference tables to obtain descriptive information. Others may be de-normalized to varying degrees and require fewer joins.

It is the responsibility of intelligent warehouse hub 23 to check incoming SQL queries and determine which summary levels could possibly fulfill its requirements. Once a set of candidate tables are determined, intelligent warehouse hub 23 selects the table that will most optimally satisfy the query (e.g., based on summarization level, size and number of joins required).

Security constraints are expressed in terms of the external virtual columns. Since virtual columns are set up in business terms, this allows security to be expressed in terms of the business rather than the physical tables. For example: a group of users could be constrained to sales for the Hardware Division and another group be restricted to sales in the Eastern region. This simplifies administration since security can more naturally be expressed in the terms of the business or subject and is relatively independent of physical changes in the warehouse. This is referred to as value security.

Security may established on all summary levels and fact tables or for specific tables. Security may be established separately for each summary level, providing dimensional security. This allows users request to see data summarized at some levels, but not others. For instance, a user of a personnel warehouse could see salaries summarized at the departmental level, but not at the individual level. If re-partitioning is necessary, the security definition remains unchanged. Security can be established by user groups or for a specific user.

Defaults are one of several techniques intelligent warehouse hub 23 employs to maintain a stable external interface for users, even when business needs force a change to warehouse database 27. Defaults provide for the automatic addition of a WHERE clause constraint on incoming queries which may suppress new additions to warehouse database 27. The constraint may be overridden by the use of a column which defines the change.

Improving ease of use for common constraints is a second use for defaults. An example is an order warehouse which contains internal company orders and external customer orders. Nearly all data requests against the warehouse are for orders for customers external to the company. Intelligent warehouse hub 23 can be configured to automatically add the constraint that the orders retrieved not include internal orders. Defaults are expressed independently of users and may be specified for each summary level. Reserved keywords for special WHERE clause criteria values may be defined by the warehouse administrator. An example is "Current Month", where intelligent warehouse hub 23 replaces this string with the string for the current month. Keyword strings and their replacement values are specified by the warehouse administrator.

The primary value of criteria keywords lies in the stability of queries over time. Queries may be re-executed with the new month's data without having to change the date criteria in the query.

Query transformations performed by intelligent warehouse hub 23 server on incoming requests also include adding Group By and Sum components where appropriate.

In most cases, the data warehouse is quite large. This presents problems with both performance and management of the data. One solution is to horizontally partition the data across multiple servers. For example, a fact table might be partitioned by year with one year's data residing on each database server.

These partitions can be identified by the administrator to intelligent warehouse hub 23. Intelligent warehouse hub 23 will then examine incoming query requests, determine which summary fact table should be used, locate which partitions/servers contain the fact data necessary to satisfy the query, issue the SQL to those servers, combine and summarize the returning data, and return the summarized data to the requesting application. Queries on multiple servers are performed in parallel.

Duplicate partitions may also be specified. This allows the load for multiple incoming queries for a specific range to be shared by several systems. For example, if most incoming queries go after the current month's data, the partition containing that data could be duplicated on two or three systems causing them to share the overall load for the current month.

Fact tables may reside on different machines and in different DBMSs. Each summary level may define its own partitioning scheme and DBMS. For example, a very highly summarized table could be specified to completely reside on a single server while lower level summary fact tables could be spread across three mid size UNIX servers. Different DBMSs may be specified for each summary level. For example, the lowest level fact table may reside in DB2 (a database available from IBM) on a mainframe and the summarized fact tables may be spread across several UNIX servers using Red Brick's query processor.

Since security is managed by intelligent warehouse hub 23 and expressed in terms of the external interface, changes to intelligent warehouse hub 23 topology do not require reworking security.

In the preferred embodiment, incoming query requests are checked by intelligent warehouse hub 23 for reasonableness or business rules of the organization. When warehouse database 27 changes over time, these types of checks need to prevent the user from making requests which would return incorrect results because of warehouse changes or inappropriately mixed information. For example, if the category of units varies by product (e.g., some units are sold by ton and some are sold by gallon) an administrator can require that a "unit type" column be included with a "number of units" collators.

The user should be prevented from requesting a field if it is not valid over the ranges specified in the query. For example, if an order fulfillment time field is added to an existing warehouse, query blocking is established to prevent a query from including that field for time periods when it was not tracked. The warehouse administrator can establish checks for various conditions.

Intelligent warehouse hub 23 is a "middleware" type of product that provides client applications rapid and simplified access to warehouse database 27. Its presence allows the warehouse administrator to monitor activity and change the structure of warehouse database 27 without changing the external view. Much of the value intelligent warehouse hub 23 provides is the hiding and simplifying of the internal structures (multiple levels of summaries, joins and aggregations) along with converting the query to the most appropriate data source and summary level.

Intelligent warehouse hub 23 performs several steps in processing an SQL request. Principally Intelligent warehouse hub 23 must perform the following:

First, intelligent warehouse hub 23 converts the query from one which references virtual tables and columns into one which matches a physical instance of data in the data warehouse. This is called rolling down the query. Second, intelligent warehouse hub 23 adds "Group By" columns and converts some columns to be aggregations. Third, if the source data is partitioned, intelligent warehouse hub 23 generates one query for each partition. Fourth, intelligent warehouse hub 23 gathers the data from the remote partitions, summarizing it as necessary to meet the request from the end user's query and converting code fields to their descriptive values.

Each of the above described actions by intelligent warehouse hub 23 may require several queries from warehouse database 27.

The exact steps Intelligent warehouse hub 23 takes to process a query are as set out in Table 4 below:

TABLE 4

Step 1: Parse the incoming query.

Step 2: Determine the most appropriate summary level to use.

Step 3: Add automatic aggregations.

Step 4: Add default criteria based on summary level.

Step 5: Add user security based on user and group.

Step 6: Locate the most appropriate summary fact level.

Step 7: Roll down the query to the target fact table.

Step 8: If the fact table is partitioned, locate the appropriate partition sources for the query.

Step 9: Generate a query for each partition.

Step 10: Issue the query to each partition server.

Step 11: Create a result table on the hub for collecting the results.

Step 12: Insert results for the data servers into the result table.

Step 13: Roll up the data in the result table to the level requested by the end user and add descriptive information where necessary.

Step 14: Return the data to the end user query tool.

The steps set out in Table 4 above are further illustrated by way of an example query.

Using a client application, the user selects the following columns: Sales Force, Product Group and List Dollars. The columns are selected with the following constraints: Fiscal quarter is first fiscal of 1993, and Sales are from U.S. Sales Organization.

The client application sends the following SQL query:

```
SELECT Sales_Force, Product_Group, ListDollars
FROM Sales, Products, Variables
WHERE Quarter = 'FY93Q1' AND Sales_Org = 'US'
```

No aggregates or Group By columns are specified. Intelligent warehouse hub 23 will determine these from the knowledge it has of the warehouse structure.

In step one, intelligent warehouse hub 23 parses the SQL into internal binary form. In the remaining steps, intelligent warehouse hub 23 operates on the internal form, however, for clarity in the explanation of this example, external SQL forms are used in the explanation of this example.

In step two, intelligent warehouse hub 23 determines the summary level to be used. If configured so, intelligent warehouse hub 23 insures any required constraint exists in the query for the partitioning column.

In step three, intelligent warehouse hub 23 adds automatic aggregations to the original query. Also, intelligent warehouse hub 23 changes columns which should be aggregated into SUM() and adds Group By columns. The amended query is as follows:

```
SELECT Sales_Force, Product_Group, SUM(ListDollars)
FROM Sales, Products, Variables
WHERE Quarter = 'FY93Q1' AND Sales_Org = 'US'
GROUP BY Sales_Force, Product_Group
```

In step four, intelligent warehouse hub 23 adds default criteria. The use of ListDollars column triggers the addition of constraints to the WHERE clause which eliminates internal orders. The amended query is as follows:

```
SELECT Sales_Force, Product_Group, SUM(ListDollars)
FROM Sales_Org, Products, Variables
WHERE Quarter = 'FY93Q1' AND Sales_Org= 'US' AND
        Order_Type !='internal'
GROUP BY Sales_Force, Product_Group
```

Intelligent warehouse hub 23 checks element combinations against the blocking criteria.

In step five, intelligent warehouse hub 23 adds User/Group Security. For example, the query is amended below so that the user is configured to only be able to access data in the CPO organization:

```
SELECT Sales_Force, Product_Group, SUM(ListDollars)
FROM Sales, Products, Variables
WHERE Quarter = 'FY93Q1'
    AND Sales_Org ='US'
    AND Order_Type !='internal'
    AND Product_Org IN ('CPO')
GROUP BY Sales_Force, Product_Group
```

In step 6, intelligent warehouse hub 23 gets the information necessary to roll down the query to the level of data in the database. In the present example, the closest summary level has the data summarized at Product Line by month and Sales Force. Therefore the equivalents to Quarter, SalesOrg and ProductOrg are needed. For each roll down, a reference table is required. The first, fqtr_tbl, provides YYMM values for the specified fiscal quarter 'FY93Q1'. The follow SQL is used:

"select month FROM fqtr_tbl WHERE qtr='FY93Q1'"

In step seven, the user's SQL statement is modified with the results of the query from the previous step to give the following result:

```
SELECT Sales_Force, Product_Group, SUM(ListDollars)
FROM Sales, Products, Variables
WHERE Month IN ('9211','9212','9301')
    AND Sales_Org ='US'
    AND Order_Type !='internal'
    AND Product_Org IN ('CPO')
GROUP BY Sales_Force, Product_Group
```

SalesOrg is the next column which needs to be rolled down. The following query against the sf_tbl reference table returns the sales forces to be included in the query:

"SELECT sf_code FROM sf_tbl WHERE sales_org= 'US'"

The user's SQL statement is further modified with the results of the previous query:

```
SELECT Sales_Force, Product_Group, SUM(ListDollars)
FROM Sales, Products, Variables
WHERE Month IN ('9211','9212','9301')
    AND Sales_Force_Code IN ('East','West','North','South')
    AND Order_Type !='internal'
    AND Product_Org IN ('CPO')
GROUP BY Sales_Force, Product_Group
```

ProductOrg needs to be rolled down to Product Group, and then Product Group is rolled down to Product Line. The queries to perform this operation are as follows:

```
SELECT a.prodline
FROM prodline a, prodgroup b
WHERE b.prodorg = 'CPO' and b.prodgroup = a.prodgroup
```

Intelligent warehouse hub 23 uses the results of the queries to modify the user's SQL as shown:

```
SELECT Sales_Force, Product_Group, SUM(ListDollars)
FROM Sales, Products, Variables
WHERE Month IN ('9211','9212','9301')
    AND Sales_Force_Code IN ('East','West','North','South')
    AND Order_Type !='internal'
    AND Product_Line IN
('LJ2','LJ3','LJ3Si','LJ4','8xx','7xx','4xx','3xx' )
GROUP BY Sales_Force, Product_Group
```

In step eight, if the fact table is partitioned, intelligent warehouse hub 23 locates the appropriate partition sources for the query.

In step nine, intelligent warehouse hub 23 generates queries to the servers which contain the desired data using the target table's column names. If the query spans several partitions, one query for each partition is generated. In some cases, more than one server will contain data within a specific range. If so, intelligent warehouse hub 23 server will attempt to balance the load between the possible servers. In other cases, all data may be contained on a single server.

In step ten, intelligent warehouse hub 23 issues the query to each partition server. In the example provided, where each month of data is on a separate server, the server containing data for the first fiscal month would receive the following query:

```
SELECT sfcode, prodline, SUM(ListDollars)
FROM system11:orders.pl_summary_9211
WHERE month IN ('9211')
    AND sfcode IN ('East','West','North','South')
    AND ord_type != 'internal'
    AND Product_Line IN
('LJ2','LJ3','LJ3Si','LJ4','8xx','7xx','4xx','3xx' )
GROUP BY salesf, prodline
```

Similar queries are produced for each of the other two months.

In step eleven, a result table, result_29118, is created on the hub with the following columns: sf_code, prodline, and ListDollars.

In step twelve, as result data records return from the data servers, they are inserted into the result table result_29118.

In step thirteen, once the data has been received from all the servers and inserted into the temporary results table, intelligent warehouse hub 23 determines what re-aggregation is necessary to convert the data to the level requested by the end user. This is referred to as rolling-up the data. For our example, the rolling up is done as follows:

First, intelligent warehouse hub 23 joins the product group/product line reference table in a query such as the following:

```
SELECT sfcode, p.Product_Group, SUM(ListDollars)
FROM result_29118, prodline_tree p
WHERE r.prodline = p.Product_Line
GROUP BY r.sfcode, p.Product_Group
```

The roll up query is modified to include rolling up the descriptive column, Sales_Force from the salesf table. The result is as follows:

```
SELECT s.Sales_Force, p.Product_Group, SUM(ListDollars)
FROM result_29118 r, prodline_tree p, sf_code s
WHERE r.prodline = p.Product_Line AND r.sfcodef =
s.Sales_Force_Code
GROUP BY s.Sales_Force, p.Product_Group
```

Although one of the criteria was expressed at the Quarter level, the resulting data does not need to be rolled up to quarter since quarter was not included in the SELECT clause. Quarter was merely a constraint for the query. Similarly even though the security constraint was the SalesOrg level, the resulting data does not need to be rolled up since the user requested only the sales force column in the result.

In step fourteen, after the data has been rolled up in the result table, intelligent warehouse hub 23 feeds back the data to the client application. In the present example, the table which is returned to the end user is as set out in Table 5 below:

TABLE 5

| Sales Force | Product Group | ListDollars |
|---|---|---|
| East Sales | Laser Printers | 1,230,112 |
| East Sales | HP-UX Systems | 3,750,394 |
| East Sales | Calculators | 2,300,385 |
| Western Sales | Laser Printers | 3,029,883 |
| Western Sales | HP-UX Systems | 4,032,099 |
| Western Sales | Calculators | 5,493 |
| Southern Sales | Laser Printers | 583,399 |
| Southern Sales | HP-UX Systems | 3,325,932 |
| Southern Sales | Calculators | 2,399 |
| Northern Sales | Laser Printers | 3,944,392 |
| Northern Sales | HP-UX Systems | 4,954,833 |
| Northern Sales | Calculators | 5,300,443 |

Intelligent warehouse hub 23 determines the optimal summary level. Intelligent warehouse hub 23 determines which summary tables contain the elements which exist in or can be derived from the fact table. A column may be derived from another by the use of a reference table. In the example query, the virtual columns that are derived are: Product_Org, Quarter and Sales_Org. The respective child columns could be: Product_Line, Month and Sales_Area.

Once all the possible summary levels have been determined, Intelligent warehouse hub 23 determines which summary tables contain all the fact columns needed by the SQL statement. From these, Intelligent warehouse hub 23 picks the highest level of summary. This table should afford the greatest performance possible.

In the preferred embodiment, queries from IW ODBC server 26 with related information, such as user, group and time of day are recorded. Also recorded are the queries sent to warehouse database 27 and results returned to the user such as the query duration, number of rows received, completion status. Intelligent warehouse hub 23 summarizes the recorded information and makes the summarized information available to a system administrator.

The information is recorded to a file on intelligent warehouse hub 23, which is periodically loaded into a data table. A tool within intelligent warehouse hub 23 analyzes the data in this table. The data is summarized and presented to the administrator in a graphical form on a personal computer.

IW ODBC Server 26 logs each record type to a log file. The format of each record is one which can be loaded into a data table. Since there are several different record types, the logging is done in a way that the correct records end up in the right tables. For example, one approach is for each instance to create a performance log file. A header for each record identifies the table to which this entry is posted. Alternatively, several separate log files per process may be used, one for each table or record type. The choice of implementation is flexible but requires that records be posted eventually to the correct table, the posting process be automatic, but not necessarily immediate, the performance recording process has very low overhead, and the performance recording process does not interfere with the database queries being made to either the metadata or data tables.

Table 6 below sets out an example of the steps by which intelligent warehouse hub 23 builds an graph. Where applicable, sample commands are included.

TABLE 6

| | |
|---|---|
| Step: 1 | Get the range of dates for the chart from the user. |
| Step: 2 | Get the list of summary levels from the metadata. |
| | SELECT level FROM level_tbl ORDER BY select_order |
| Step: 3 | Get the number of times each summary level has been used from the performance tables. |
| | SELECT SummaryLevel, COUNT(QueryID) |
| | WHERE Timestamp >= StartDate AND |
| | Timestamp <= EndDate |
| | FROM QueryResult |
| | GROUP BY SummaryLevel |
| Step: 4 | Get the approximate size of each summary level from the metadata. |
| | SELECT SummaryLevel, SUM(Size*Rows) |
| | FROM PartitionInfo |
| | GROUP BY SummaryLevel |
| Step: 5 | Plot the graph. |

The queries set out in Table 6 may be combined to improve performance and simplify the process.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for providing access to information stored in a database warehouse, the method comprising the steps of:
  (a) arranging data in data tables within the database warehouse;
  (b) providing to a user, by a warehouse database hub interface, a schema of the data in the database warehouse, the schema consisting of virtual tables, wherein arrangement of the data in the virtual tables is different than arrangement of the data in the data tables, and wherein the user is allowed access to the data in the data tables only through the schema consisting of the virtual tables; and,
  (c) in response to a query from the user for particular information stored in the database warehouse, the query being based on the schema provided by the warehouse database hub interface, performing the following substeps by the warehouse database hub interface:

(c.1) receiving, by the warehouse database hub interface, the query from the user before the query is forwarded to the database warehouse, (c.2) modifying, by the warehouse database hub interface, the query to take into account the arrangement of the data within the database warehouse (c.3) querying, by the warehouse database hub interface, the database warehouse using the modified query to obtain the particular information from the database warehouse, and (c.4) forwarding the particular information obtained from the database warehouse to the user.

2. A method as in claim 1 wherein substep (c.2) includes the substeps of:

adding aggregations to the query; and, adding defaults to the query, particular defaults added being based on summary levels of the query.

3. A method as in claim 1 wherein substep (c.2) includes the substep of:

adding limitations to the query for security purposes, the limitations being based on user and group identifications within the query.

4. A method as in claim 1 wherein substep (c.2) includes the substep of:

converting the query to utilize tables with pre-computed values and higher levels of summary.

5. A method as in claim 1 wherein substep (c.2) includes the substeps of:

locating appropriate partition sources for the query; and, generating a new query to each appropriate partition source located.

6. A method as in claim 1 wherein substep (c.3) includes the substeps of:

creating a result table; and, inserting database information into the result table as the database information is received from the database warehouse.

7. A method as in claim 6 wherein substep (c.3) additionally includes the substep of:

changing summary level of the database information in the result table to generate the particular information required by the query.

8. A method as in claim 7 wherein substep (c.3) additionally includes the substep of:

adding descriptive information as part of the particular information.

9. A method as in claim 1 wherein substep (c.2) includes adding a WHERE clause to the query in order to suppress recent changes to the data tables within the database warehouse.

10. A method as in claim 1 wherein substep (c.2) includes adding a constraint to prevent internal orders from being retrieved.

11. A method as in claim 1 wherein substep (c.2) includes replacing keyword strings with replacement values for the keyword strings.

12. A method as in claim 1 additionally comprising the following steps:

(d) recording queries from users received by the warehouse hub interface;

(e) recording modified queries forwarded from the warehouse database hub interface to the database warehouse;

(f) recording responses to the queries recorded in steps (d) and (3); and, (g) summarizing into tables, information recorded in steps (d), (e) and (f).

13. A method as in claim 1 wherein step (c) additionally comprises the following substeps::

(c.5) checking the query against a plurality of business rules;

(c.6) when the query does not obey the business rules, returning the query to the user with an error message without performing substeps (c.2), (c.3), and (c.4).

14. A database warehouse comprising:

a database which includes data arranged in data tables;

a warehouse database hub interface, coupled to the database, the warehouse database hub interface presenting to a user, a schema of the data in the database, the schema consisting of virtual tables, wherein arrangement of the data in the virtual tables is different than arrangement of data in the data tables, wherein the user is allowed access to the data in the data tables only through the schema consisting of the virtual tables, and wherein, in response to a query from the user for particular information stored in the database, the query being based on the schema provided by the warehouse database hub interface, the warehouse database hub interface intercepts and modifies the query to take into account the arrangement of the data within the database, queries the database using the modified query to obtain the particular information from the database, and forwards the particular information obtained from the database to the user.

15. A database warehouse as in claim 14 wherein the warehouse database hub interface modifies the query by adding aggregations to the query and adding defaults, based on summary level, to the query.

16. A database warehouse as in claim 14 wherein the warehouse database hub interface modifies the query by adding limitations to the query for security purposes, the limitations being based on user and group identifications within the query.

17. A database warehouse as in claim 14 wherein the warehouse database hub interface modifies the query by converting the query to search for a level of data which exists in a data table within the database.

18. A database warehouse as in claim 14 wherein the warehouse database hub interface modifies the query by locating appropriate partition sources for the query, and generating a new query to each appropriate partition source located.

19. A database warehouse as in claim 14 wherein as the warehouse database hub interface queries the database using the modified query to obtain the particular information from the database, the warehouse database hub interface creates a result table and inserts database information into the result table as the database information is received from the database.

20. A database warehouse as in claim 19 wherein the warehouse database hub interface changes summary level of the database information in the result table to generate the particular information.

21. A database warehouse as in claim 20 wherein the warehouse database hub interface adds descriptive information as part of the particular information.

22. A database warehouse as in claim 14 wherein the warehouse database hub interface modifies the query by adding a WHERE clause to the query in order to suppress recent changes to the data tables within the database.

23. A database warehouse as in claim 14 wherein the warehouse database hub interface modifies the query by adding a constraint to prevent internal orders from being retrieved.

24. A database warehouse as in claim 14 wherein the warehouse database hub interface modifies the query by replacing keyword strings with replacement values for the keyword strings.

25. A database warehouse as in claim 14 wherein the warehouse database hub interface includes:

recording means for recording queries from users received by the warehouse hub interface, modified queries forwarded from the warehouse database hub interface to the database, and responses to the queries; and, summarizing means for summarizing into tables information recorded by the recording means.

26. A database warehouse as in claim 14 wherein the warehouse database hub interface additionally checks the query against a plurality of business rules and when the query does not obey the business rules, the warehouse database hub interface returns the query to the user with an error message without performing modifying the query and forwarding the modified query to the database.

* * * * *